United States Patent
Okada et al.

(10) Patent No.: US 6,894,752 B2
(45) Date of Patent: May 17, 2005

(54) LIQUID CRYSTAL DISPLAY DEVICE

(75) Inventors: Hiroyuki Okada, Toyama (JP); Hiroshi Ohno, Toyama (JP); Hiroyoshi Onnagawa, Toyama (JP)

(73) Assignee: President of Toyama University, Toyama (JP)

( * ) Notice: Subject to any disclaimer, the term of this patent is extended or adjusted under 35 U.S.C. 154(b) by 91 days.

(21) Appl. No.: 10/245,756

(22) Filed: Sep. 18, 2002

(65) Prior Publication Data

US 2003/0053020 A1 Mar. 20, 2003

(30) Foreign Application Priority Data

Sep. 19, 2001 (JP) ........................................ 2001-285342

(51) Int. Cl.[7] .......................................... G02F 1/1337
(52) U.S. Cl. ...................................................... 349/129
(58) Field of Search ................................ 349/129, 143, 349/142, 76

(56) References Cited

U.S. PATENT DOCUMENTS

| | | | |
|---|---|---|---|
| 5,309,264 A | | 5/1994 | Lien et al. |
| 5,434,687 A | * | 7/1995 | Kawata et al. ................. 349/96 |
| 5,610,743 A | * | 3/1997 | Tsai ............................ 349/124 |
| 6,175,398 B1 | * | 1/2001 | Yamada et al. ................. 349/96 |
| 6,342,938 B1 | | 1/2002 | Song et al. |

FOREIGN PATENT DOCUMENTS

| | | |
|---|---|---|
| JP | 63-19880 | 2/1988 |
| JP | 6-324337 | 11/1994 |
| JP | 7-234414 | 9/1995 |
| JP | 9-304757 | 11/1997 |
| JP | 11-258605 | 9/1999 |
| JP | 11-352490 | 12/1999 |
| JP | 2003-75851 | 3/2003 |
| KR | 2000-59471 | 10/2000 |
| KR | 2001-5217 | 1/2001 |
| TW | 354833 | 3/1999 |

OTHER PUBLICATIONS

K. Ohmuro, et al., International Symposium Digest of Technical Papers, vol. 28, XP-000722823, pp. 845–848, "33.3: Development of Super–High–Image–Quality Vertical–Alignment–Mode LCD ", May. 13, 1997.

* cited by examiner

Primary Examiner—James Dudek
Assistant Examiner—Richard H Kim
(74) Attorney, Agent, or Firm—Oblon, Spivak, McClelland, Maier & Neustadt, P.C.

(57) ABSTRACT

A liquid crystal display device comprises a liquid crystal layer containing a nematic liquid crystal material, first and second light-transmissive substrates which hold the nematic liquid crystal material therebetween such that liquid crystal molecules are aligned in a predetermined directions, and first and second circular electrodes which are formed on the first and second light-transmissive substrates and apply to the liquid crystal layer an electric field for controlling the orientation of the liquid crystal molecules. In particular, the first and second circular electrodes include radial light-shielding electrode lines and concentric light-shielding electrode lines, which are opposed to each other to divide the liquid crystal layer into a plurality of domains between which liquid crystal molecules are set in different tilt directions under the electric field.

3 Claims, 3 Drawing Sheets

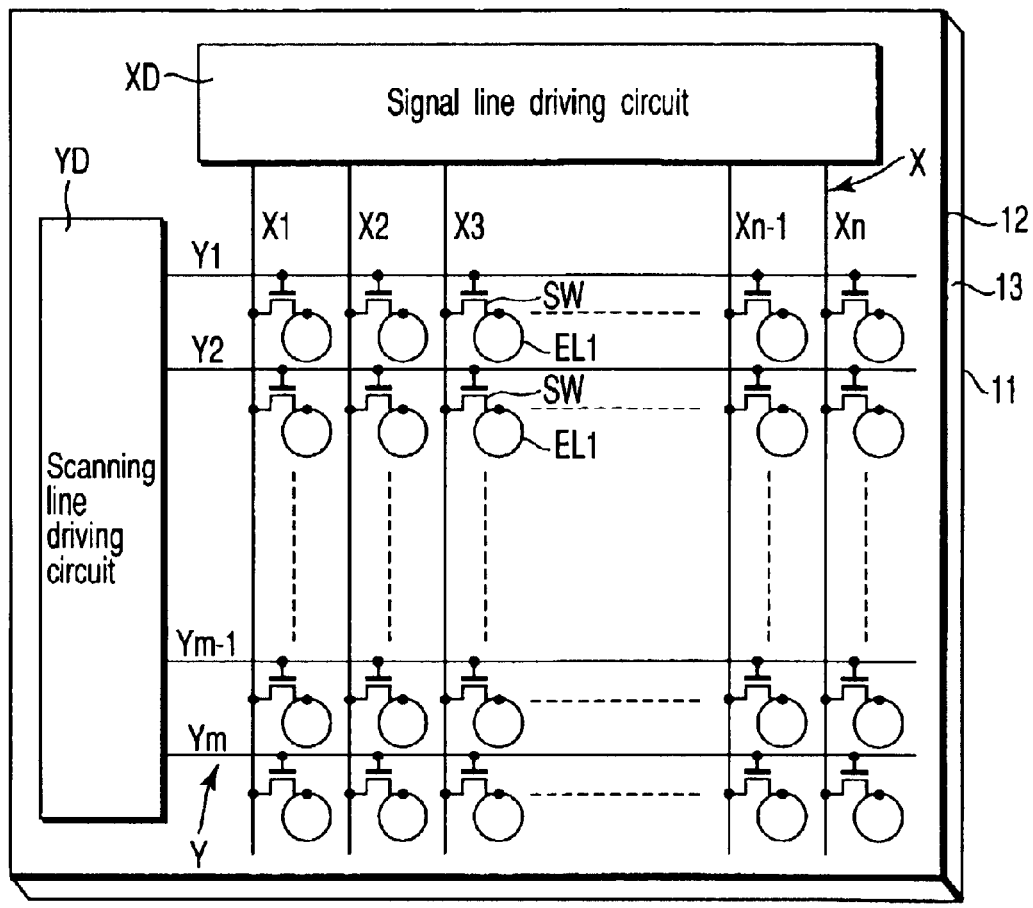
F I G. 1
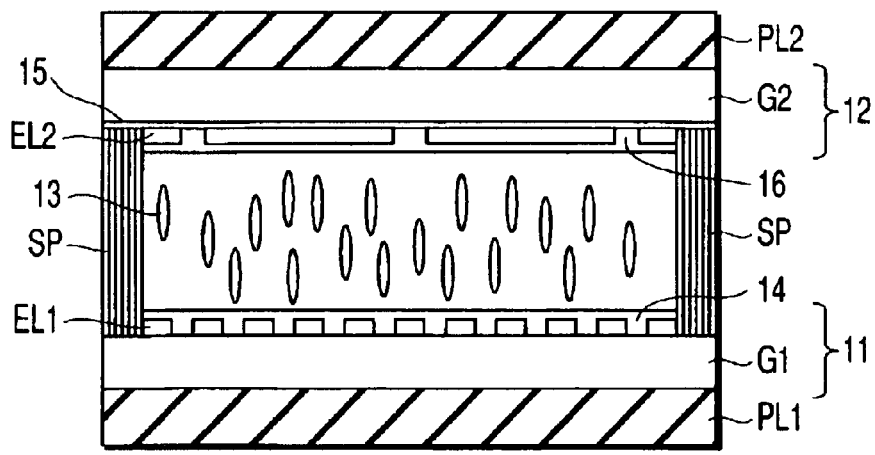
F I G. 2

LIQUID CRYSTAL DISPLAY DEVICE

CROSS-REFERENCE TO RELATED APPLICATIONS

This application is based upon and claims the benefit of priority from the prior Japanese Patent Application No. 2001-285342, filed Sep. 19, 2001, the entire contents of which are incorporated herein by reference.

BACKGROUND OF THE INVENTION

1. Field of the Invention

The present invention relates generally to a liquid crystal display device wherein a liquid crystal layer is held between a pair of electrode substrates, and more particularly to a liquid crystal display device whose liquid crystal layer is divided into a plurality of domains among which liquid crystal molecules are set in different tilt directions.

2. Description of the Related Art

Liquid crystal display (LCD) panels are applied to various technical fields of OA equipment, information terminals, watches, televisions, etc., because of their characteristics of lightness, thinness, and low power consumption. In particular, an active matrix type LCD panel has an excellent response characteristic obtained by thin film transistors for switching pixels. Thus, the active matrix type LCD panel is used as a monitor display for a portable TV or a computer, which is required to quickly display a large quantity of image information.

In these years, with an increase in quantity of information, there is a demand for enhancement of the resolution and display speed of the liquid crystal display panel. As a technique of enhancing the resolution, the number of pixels is increased by miniaturization of the TFT array structure. In this case, an LCD mode, which can provide a response speed of liquid crystal molecules twice to several tens of times higher than the current level, is required to change the alignment of liquid crystal molecules in a period shortened according to the increase in the number of pixels. Such an LCD mode can be selected from Optically Compensated Birefringence (OCB), Vertically Aligned Nematic (VAN), Hybrid Aligned Nematic (HAN), and π-alignment modes using a nematic liquid crystal, and Surface-Stabilized Ferroelectric Liquid Crystal (SSFLC) and Anti-Ferroelectric Liquid Crystal (AFLC) modes using a smectic liquid crystal, for example.

Particular attention has recently been paid to the VAN mode, which has a higher response speed than the conventional twisted nematic (TN) mode and adopts a vertical alignment treatment, thus dispensing with a conventional rubbing process that may cause defects such as electrostatic destruction. Moreover, a design for viewing angle compensation becomes easier when the VAN mode is employed. The viewing angle can be widened by a multi-domain structure that each pixel region of the liquid crystal layer is divided into a plurality of domains between which liquid crystal molecules are set in different tilt directions.

In the above-mentioned multi-domain structure, the plurality of domains are created, for example, by causing an electric field applied from each electrode into the liquid crystal layer to be non-uniform at an inside part or periphery of the electrode, so that the tilt directions can be determined according to the dielectric constant anisotropy of liquid crystal material and the non-uniformity of electric field. Conventionally, sufficient multi-directional components are not obtained in the non-uniform electric field, with a result that the viewing angle characteristic is made uneven. In addition, it is difficult to control the threshold characteristic defining a point from which a change in the transmittance is initiated.

BRIEF SUMMARY OF THE INVENTION

An object of the present invention is to provide a liquid crystal display device which can control the threshold characteristic while remedying the unevenness in the viewing angle characteristic owing to the shape of each electrode.

According to an aspect of the present invention, there is provided a liquid crystal display device comprising: a liquid crystal layer containing a nematic liquid crystal material; first and second light-transmissive substrates which hold the nematic liquid crystal material therebetween such that liquid crystal molecules are aligned in a predetermined directions; and first and second circular electrodes which are formed on the first and second light-transmissive substrates and apply to the liquid crystal layer an electric field for controlling the orientation of the liquid crystal molecules; wherein the first and second circular electrodes include radial light-shielding electrode lines and concentric light-shielding electrode lines, respectively, and the radial electrode lines and the concentric electrode lines are opposed to each other to divide the liquid crystal layer into a plurality of domains between which liquid crystal molecules are set in different tilt directions under the electric field.

In this liquid crystal display device, an electric field is applied to the liquid crystal layer from the radial light-shielding electrode lines and concentric light-shielding electrode lines. Under the electric field, the liquid crystal layer is divided into a plurality of domains between which liquid crystal molecules are set in different tilt directions. With this structure, the plural domains are made symmetric with respect to the center of each circular electrode, and thus the viewing angle characteristic can be prevented from being made uneven. In addition, the domain size gradually increases in the radial direction outward from the center of the circular electrode, and thus the threshold characteristic, i.e. the point from which a change in the transmittance is initiated can be controlled. Moreover, when an image is displayed using a region corresponding to the circular electrodes as a pixel, curves in the displayed image can be prevented from being degraded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 1 is a diagram showing a planar structure of a liquid crystal display (LCD) panel according to an embodiment of the present invention;

FIG. 2 a diagram showing a cross-sectional structure of pixels of the LCD panel shown in FIG. 1;

DETAILED DESCRIPTION OF THE INVENTION

Figure 3:
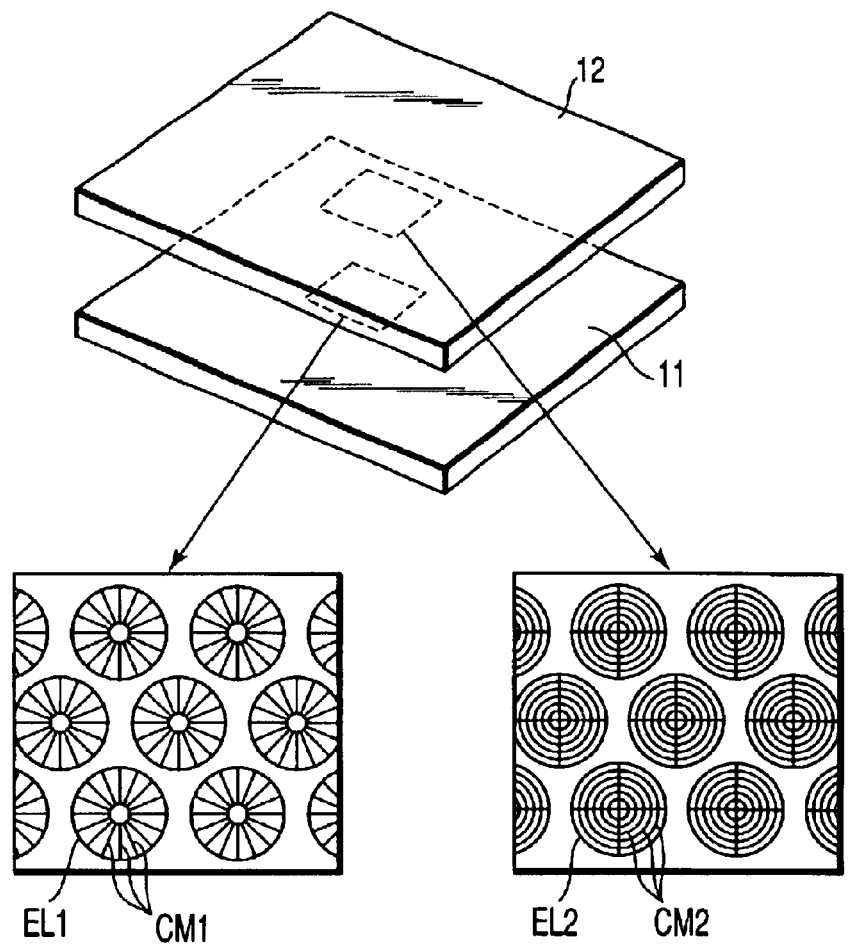
FIG. 3 is a diagram showing an arrangement of pixel electrodes and counter electrodes, which are opposed in the LCD panel shown in FIG. 2.

An active matrix liquid crystal display (LCD) panel according to an embodiment of the present invention will now be described with reference to the accompanying drawings.

FIG. 1 shows a planar structure of the LCD panel, and FIG. 2 shows a cross-sectional structure of pixels of the LCD panel. The LCD panel operates in a multi-domain VAN mode. The LCD panel comprises light-transmissive electrode substrates 11 and 12, and a liquid crystal layer 13 containing a nematic liquid crystal material held between the electrode substrates 11 and 12.

The electrode substrate 11 comprises a plurality of pixel electrodes EL1 arrayed substantially in a matrix form; a plurality of scanning lines Y (Y1 to Ym) disposed along rows of the pixel electrodes EL1; a plurality of signal lines X (X1 to Xn) disposed along columns of the pixel electrodes EL1; a plurality of switching elements SW disposed near intersections of the scanning lines Y and signal lines X; a scanning line driving circuit YD for driving the scanning lines Y; and a signal line driving circuit XD for driving the signal lines X. The pixel electrodes EL1 are formed on an insulating substrate G1 shown in FIG. 2, and covered with an alignment film 14 which aligns liquid crystal molecules of the liquid crystal layer 13 substantially vertical to the electrode substrate 11 plane in a voltage non-application state. The switching elements SW are formed of amorphous-silicon or polysilicon thin-film transistors. The scanning line driving circuit YD and signal line driving circuit XD are formed of, e.g. polysilicon thin-film transistors or Si peripheral circuit. Each switching element SW is driven via a corresponding scanning line Y to electrically connect a corresponding signal line X to a corresponding pixel electrode EL1. Although not shown in FIG. 2, the scanning lines Y, signal lines X, switching elements SW, scanning line driving circuit YD and signal line driving circuit YD are disposed on the insulating substrate G1.

The electrode substrate 12 includes a color filter 15 formed on an insulating substrate G2; a plurality of counter electrodes EL2 formed on the color filter 15 and opposed to the pixel electrodes EL1; and an alignment film 16 which covers the counter electrodes EL2 and aligns liquid crystal molecules of the liquid crystal layer 13 substantially vertical to the electrode substrate 12 plane in a voltage non-application state. The color filter 15 includes three color layers of red (R), green (G) and blue (B) formed in pixel regions defined by the electrodes EL1 and EL2, and shield layers formed around the pixel regions defined by the electrodes EL1 and EL2.

It is preferable that the insulating substrate G1, G2 be formed of such a transparent material as glass, polycarbonate, or a cycloolefin resin, and has low hygroscopicity, thermal resistance, low birefringence, and high dimensional stability. The electrode substrates G1 and G2 and liquid crystal layer 13 are integrated by means of a peripheral sealing member surrounding the liquid crystal layer 13 between the electrode substrates 11 and 12. The cell thickness of the liquid crystal layer 13 is kept substantially constant by columnar spacers SP which are formed in contact with the electrode substrates 11 and 12 at a central area of the pixel region and an outside area of the pixel region. It is preferable that a pre-tilt angle of liquid crystal molecules, which is provided by the alignment film 14, 16, be 90°. The LCD panel further comprises polarization plates PL1 and PL2 covering those surfaces of the electrode substrates 11 and 12, which are located opposite to the liquid crystal layer 13. The polarization plates PL1 and PL2 are affixed to the electrode substrates G1 and G2 in such orientations that their polarization axes are set in a cross-Nicol.

Figure 4:
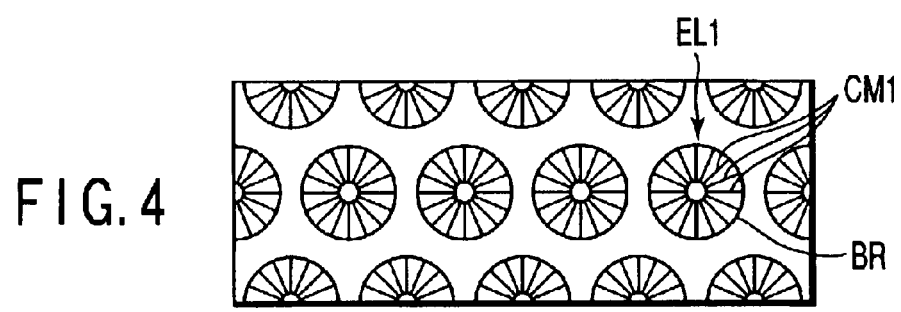
FIG. 4 is a diagram showing a planar structure of the pixel electrodes shown in FIG. 3.
Figure 5:
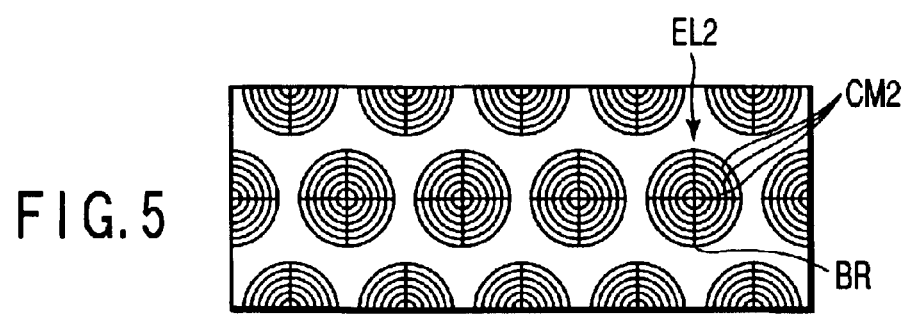
FIG. 5 is a diagram showing a planar structure of the counter electrodes shown in FIG. 3.
Figure 6:
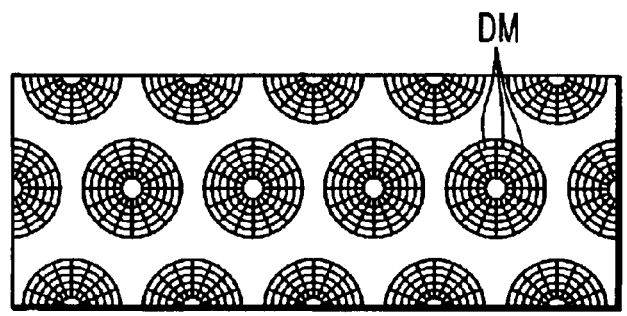
FIG. 6 is a diagram showing a plurality of domains obtained by a combination of the pixel electrode shown in FIG. 4 and the counter electrode shown in FIG. 5.

The pixel electrodes EL1 and counter electrodes EL2 are, as shown in FIG. 3, circular electrodes for applying an electric field to the liquid crystal layer 13 to control orientation of liquid crystal molecules serving as a pixel of a circular form defined by these circular electrodes. The pixel electrodes EL1 and counter electrodes EL2 are arrayed substantially in a matrix form. In fact, however, these electrodes are slightly displaced to eliminate useless regions among the pixels, as shown in FIG. 3. Each of the pixel electrodes EL1 is formed of light-shielding electrode lines CM1 which are arranged radially in the pixel region, as shown in FIG. 4. Each of the counter electrodes EL2 is formed of light-shielding electrode lines CM2 which are arranged concentrically about the center of the pixel region, as shown in FIG. 5. The light-shielding electrode lines CM1 are connected to a bridge fine line BR disposed, e.g. along periphery of the pixel region. The light-shielding electrode lines CM2 are connected to a cruciform bridge fine lines BR disposed, e.g. to extend vertically and horizontally and intersect at the center of the pixel region. The light-shielding electrode lines CM1 and CM2 are opposed to each other as shown in FIG. 6, so as to apply an electric field to a pixel region of the liquid crystal layer 13 and divide the pixel region into a plurality of domains DM between which liquid crystal molecules are set in different tilt directions. In the above-described structure, it is considered that there is no substantial movement of liquid crystal molecules adjacent to the electrode lines CM1 and CM2 because of the symmetry of the electrode lines CM1 and CM2. It is necessary, however, to prevent light leak from disclination lines created according to distribution of the electric field. The electrode lines CM1 and CM2 are formed of the light-shielding material in order to prevent the light leak from the disclination lines. The radius of each of the electrodes EL1 and EL2 is set at, e.g. 60 $\mu$m, and the line widths of the electrode lines CM1 and CM2 are set at 2 $\mu$m and 3 $\mu$m, respectively.

In the actual manufacturing, the precision of a stepper for forming electrodes is about 1.5 $\mu$m in the state of the art. The precision in alignment for attaching the electrode substrates 11 and 12 is about 2 $\mu$m in the state of the art. If the precision of the stepper and the precision in alignment with these values are available, the domains DM can be obtained, as shown in FIG. 6, by precisely dividing the liquid crystal layer 13 at the intervals of about 10 $\mu$m for each pixel.

A description will now be given of a liquid crystal display (LCD) panel manufactured as a sample. In this LCD panel, the radius of each electrode EL1, EL2 was set at 60 μm, as mentioned above. The radial electrode lines CM1 were patterned with a line width of 2 μm so as to equally divide the electrode EL1 into 16 portions in its circumferential direction. The concentric electrode lines CM2 were patterned with a line width of 3 μm so as to divide the electrode EL2 at radial points of 10 μm, 20 μm, 30 μm, 40 μm, 50 μm and 60 μm from the center of the electrode EL2. As a result, the number of domains was set at 80. The liquid crystal layer 13 was formed of a liquid crystal material with anisotropic dielectric constant $\Delta\epsilon=17.3$ and birefringence $\Delta n=0.286$. Each of the alignment films 14 and 16 was formed by vertical alignment treatment of a full-coated silane coupling material.

Figure 7:
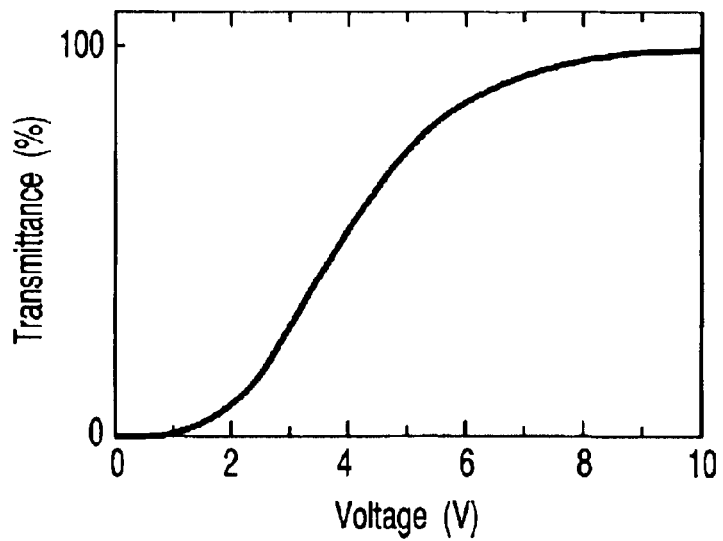
FIG. 7 is a graph showing the voltage-to-transmittance characteristic of an LCD panel actually manufactured with a multi-domain structure shown in FIG. 6.

FIG. 7 shows the voltage-to-transmittance characteristic of the actually manufactured LCD panel. The transmittance gradually rises with a threshold point of about 2V, and the contrast ratio is 210:1. A voltage was applied between the pixel electrode EL1 and counter electrode EL2, and the liquid crystal alignment was observed by a polarization microscope. It was confirmed that there was a multi-domain structure wherein the liquid crystal alignment differs between the domains of the pixel region partitioned by the radial electrode lines CM1 and concentric electrode lines CM2.

Figure 8:
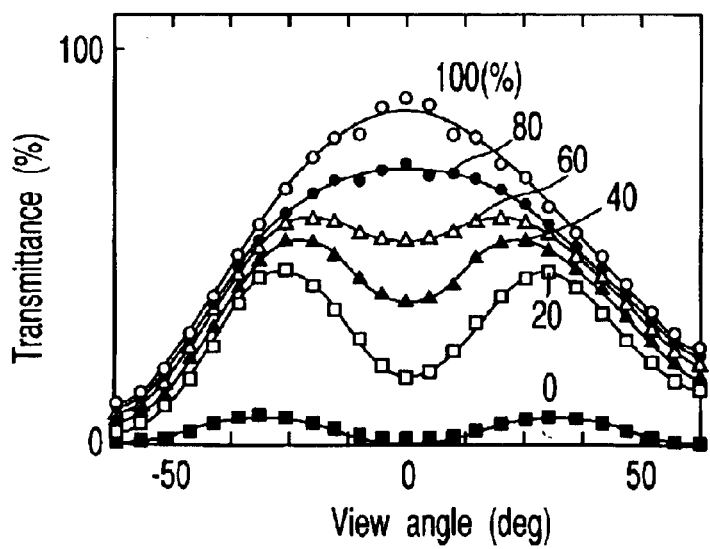
FIG. 8 is a graph showing the viewing angle characteristic of the LCD panel actually manufactured with the multi-domain structure shown in FIG. 6.

FIG. 8 shows the viewing angle characteristic of the LCD panel. The viewing angle characteristic is measurement results obtained by applying voltages for attaining transmittances of 100%, 80%, 60%, 40%, 20% and 0% in a front view. Although the pixel was divided in units of 22.5° in the circumferential direction, the measurement results show that the variation in transmittance was substantially symmetric in all viewing angles.

In the LCD panel of the present embodiment, an electric field is applied to the liquid crystal layer 13 from the radial light-shielding electrode lines CM1 and concentric light-shielding electrode lines CM2. Under the electric field, the liquid crystal layer 13 is divided into domains DM between which liquid crystal molecules are set in different tilt directions. With this structure, the plural domains DM are made symmetric with respect to the center of the electrodes EL1 and EL2, and thus the unevenness in the viewing angle characteristic can be remedied. In addition, the domain size is gradually varied in the radial direction outward from the center of the electrodes EL1 and EL2, and thus the threshold characteristic, i.e. the point from which a change in the transmittance is initiated can be controlled. Moreover, when an image is displayed using a region corresponding to the circular electrodes EL1 and EL2 as a pixel, curves in the displayed image can be prevented from being degraded.

The present invention is not limited to the above-described embodiment, and various modifications can be made without departing from the spirit of the invention.

In the above embodiment, the alignment films 14 and 16 are subjected to alignment treatment such that the liquid crystal molecules of the liquid crystal layer 13 are aligned substantially vertical to the planes of the electrode substrates 11 and 12 in a voltage non-application state. Alternatively, the alignment films 14 and 16 may be subjected to alignment treatment such that the liquid crystal molecules of the liquid crystal layer 13 are aligned substantially horizontal with respect to the planes of the electrode substrates 11 and 12 in a voltage non-application state. In this case, it is preferable that the pre-tilt angle of liquid crystal molecules provided by the alignment films 14 and 16 be 0°.

In the above embodiment, the pixel electrodes EL1, as well as the scanning line driving circuit YD, signal line driving circuit XD and switching elements SW, are provided on the electrode substrate 11, and the counter electrodes EL2 are provided on the electrode substrate 12 so as to face the pixel electrodes EL1. Alternatively, the structural relationship between the pixel electrodes EL1 and the counter electrodes EL2 may be reversed since the transmittance of the liquid crystal layer 13 is controlled by a potential difference between the pixel electrodes EL1 and the counter electrodes EL2. For example, each of the pixel electrodes EL1 is formed of concentric light-shielding electrode lines CM2, and each of the counter electrodes EL2 is formed of radial light-shielding electrode lines CM1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:

a liquid crystal layer containing a nematic liquid crystal material;

first and second light-transmissive substrates which hold said nematic liquid crystal material therebetween such that liquid crystal molecules are aligned in a predetermined directions; and first and second circular electrodes which are formed on said first and second light-transmissive substrates and apply to said liquid crystal layer an electric field for controlling the orientation of said liquid crystal molecules;

wherein said first and second circular electrodes include radial light-shielding electrode lines and concentric light-shielding electrode lines, respectively, and said radial electrode lines and said concentric electrode lines are opposed to each other to divide said liquid crystal layer into a plurality of domains between which liquid crystal molecules are set in different tilt directions under said electric field.

2. A liquid crystal display device according to claim 1, wherein said first and second light-transmissive substrates include alignment films, respectively, which cover said first and second circular electrodes and align said liquid crystal molecules in one of a substantially vertical direction to a substrate plane and a substantially horizontal direction to the substrate plane.

3. A liquid crystal display device according to claim 2, wherein a pair of polarizing plates are disposed on said first and second light-transmissive substrates, said polarizing plates having polarization axes perpendicular to each other.

* * * * *